United States Patent [19]

Komatsu

[11] Patent Number: 5,680,133
[45] Date of Patent: Oct. 21, 1997

[54] ANALOG-TO-DIGITAL CONVERTER

[75] Inventor: Yoshihiro Komatsu, Kanagawa, Japan

[73] Assignee: Sony Corporation, Japan

[21] Appl. No.: 572,617

[22] Filed: Dec. 14, 1995

[51] Int. Cl.[6] .................................................. H03M 1/00
[52] U.S. Cl. ........................ 341/155; 341/141; 341/159
[58] Field of Search .................................. 341/126, 141, 341/155, 159, 137

[56] References Cited

U.S. PATENT DOCUMENTS

| | | | |
|---|---|---|---|
| 4,398,179 | 8/1983 | Kaneko | 340/347 |
| 4,774,577 | 9/1988 | Takimoto | 358/148 |
| 5,113,189 | 5/1992 | Messer et al. | 341/143 |
| 5,150,120 | 9/1992 | Yunus | 341/143 |
| 5,450,085 | 9/1995 | Stewart et al. | 341/159 |
| 5,583,503 | 12/1996 | Kusakabe | 341/161 |

*Primary Examiner*—Jeffrey A. Gaffin
*Assistant Examiner*—Jason H. Vick
*Attorney, Agent, or Firm*—Ronald P. Kananen

[57] ABSTRACT

In a demultiplex circuit and an analog-to-digital converter using the demultiplex circuit, since the reset means for controlling the phase of the second clock output from the frequency divider circuit is provided, it is possible to establish the phase of the second clock to establish the output timing of the demultiplex circuit. In addition, since the reset means for controlling the phase of the second clock output from the frequency divider circuit, it is also possible to establish the phase of the second clock to establish the output timing of the analog-to-digital converter.

3 Claims, 3 Drawing Sheets

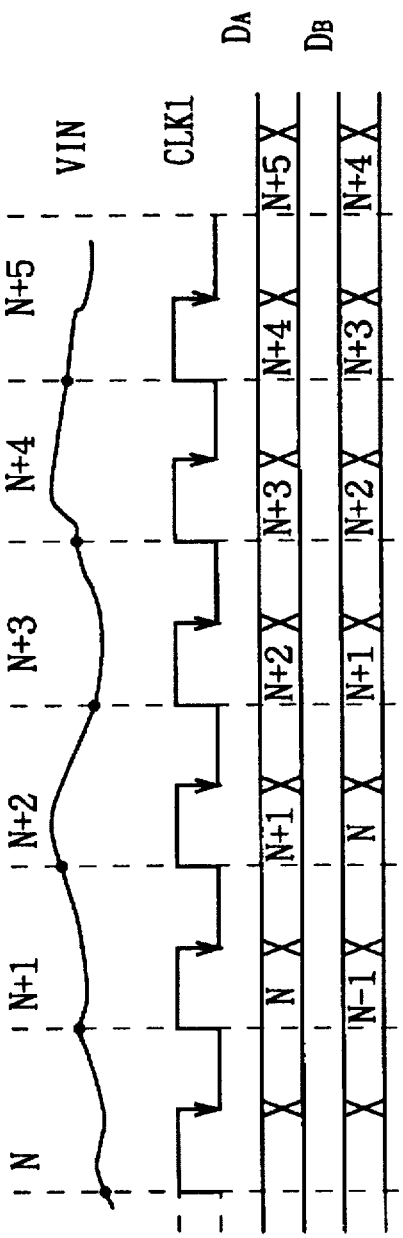
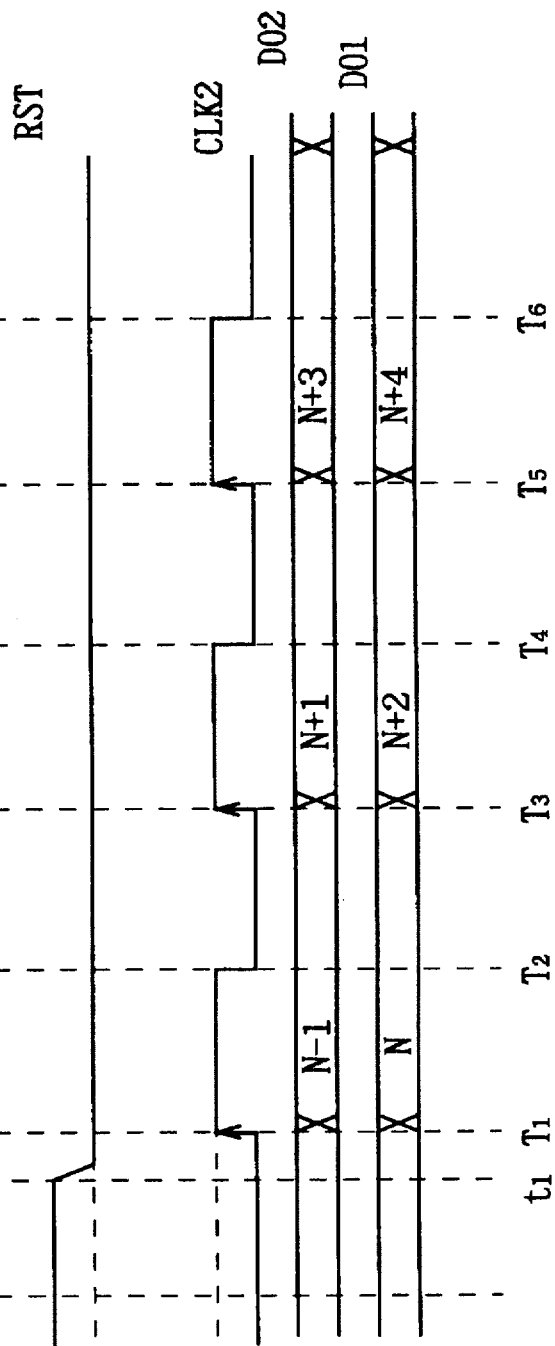
FIG. 2A
FIG. 2B
FIG. 2C
FIG. 2D
FIG. 2E
FIG. 2F
FIG. 2G
FIG. 2H

5,680,133

ANALOG-TO-DIGITAL CONVERTER

BACKGROUND OF THE INVENTION

1. Field of the Invention

The present invention is related to a demultiplex circuit and an analog-to-digital converter and is suitable in particular for a high-speed analog-to-digital converter with a built-in demultiplexer.

2. Description of the Related Art

An analog-to-digital converter (hereinafter referred to as ADC) has a built-in demultiplexer on an output side to decrease an output data rate by outputting a digital data in each specified block in parallel by the demultiplexer. For example, using a frequency-divided sampling clock of digital data as the clock of the demultiplexer, the output of the digital data of one clock before and that of present clock in parallel enables to decrease the output data rate down to half. By decreasing the output data in this way, even CMOS circuits with their comparatively slower operating timing, can be connected to the output side of an ADC.

When clocks are generated in the frequency divider circuit of the ADC, the clock phase may shift by 180 degrees. In this case, the phases of each output data also shift by 180 degrees pursuant to shifting clock phases. In accordance with two types of clock phase generated in this way, the output data is also generated from the demultiplexer in two types of phase. Moreover, it is unknown in which phase the output data is generated.

In the case where only one ADC is used, the above-mentioned phenomenon does not invite any particular problem. However, if a plurality of ADCs are used, there occurs a problem that the output phase synchronization cannot be established due to fluctuating output timing.

OBJECT AND SUMMARY OF THE INVENTION

In view of the foregoing, an object of the present invention is to provide a demultiplex circuit and an analog-to-digital converter which can establish the data output timing.

The foregoing object and other objects of the invention have been achieved by the provision of a demultiplex circuit, comprising: a frequency divider circuit for frequency-dividing a first clock, and for generating a second clock; reset means for controlling the phase of the second clock output from the frequency divider circuit; and a demultiplexer for outputting input data, which is input in order of time, in parallel in specified blocks based on the first and second clocks.

Furthermore, the present invention provides the demultiplex circuit, comprising: a frequency divider circuit for frequency-dividing a first clock, and for generating a second clock; reset means for controlling the phase of the second clock output from the frequency divider circuit; and a plurality of demultiplexers for outputting input data, which are input in order of time, in parallel in specified blocks based on the first and second clocks, respectively.

Furthermore, the present invention provides an analog-to-digital converter, comprising: a frequency divider circuit for frequency-dividing a first clock, and for generating a second clock; reset means for controlling the phases of the second clock output from the frequency divider circuit; analog-to-digital conversion means for converting an input signal to digital data based on the first clock; and a demultiplexer for outputting input data, which is input in order of time, in parallel in specified blocks based on the first and second clocks.

Furthermore, the present invention provides an analog-to-digital converter, comprising: a frequency divider circuit for frequency-dividing a first clock, and for generating a second clock; reset means for controlling the phases of the second clock output from the frequency divider circuit; analog-to-digital conversion means for converting an input signal to digital data based on the first clock; and a plurality of demultiplexers for outputting input data, which are input in order of time, in parallel in specified blocks based on the first and second clocks, respectively.

The present invention provides the frequency divider circuit for frequency-dividing a first clock to generate a second clock, the reset means for controlling the phase of the second clock output from the frequency divider circuit, and the demultiplexer for outputting input data, which is input in order of time, in parallel in specified blocks based on the first and second clocks, so that it is possible to establish the output timing of the demultiplex circuit by establishing the phases of the second clock. Consequently, it is possible to synchronize the output timing among a plurality of demultiplex circuits when using a plurality of demultiplex circuits.

Furthermore, the present invention provides the frequency divider circuit for frequency-dividing a first clock to generate a second clock, the reset means for controlling the phases of the second clock output from the frequency divider circuit, the analog-to-digital conversion means for converting an input signal to digital data based on the first clock, and the demultiplexer for outputting input data, which is input in order of time, in parallel in specified blocks based on the first and second clocks, so that it is possible to establish the output timing of the analog-to-digital converter by establishing the phases of the second clock. Consequently, it is possible to synchronize the output timing of a plurality of analog-to-digital converter when using a plurality of analog-to-digital converter.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2H are timing charts showing an analog-to-digital converter shown in FIG. 1.

DETAILED DESCRIPTION OF THE PREFERRED EMBODIMENTS

Figure 1:
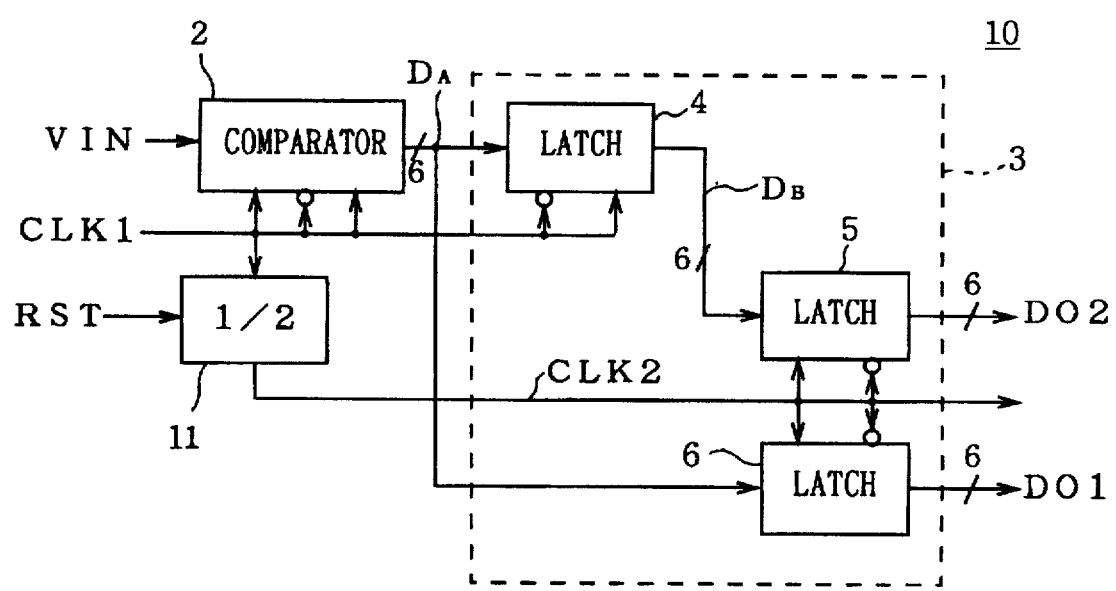
FIG. 1 is a block diagram showing an analog-to-digital converter according to the first embodiment of the present invention.

Preferred embodiments of the present invention will be described with reference to the accompanying drawings:

FIGS. 1 and 2A to 2H show the first embodiment according to the present invention. In FIG. 1, 10 represents an ADC as a whole. A reset signal RST is input into a frequency divider circuit 11. When the reset signal RST is changed over from the logic "H" to the logic "L", clock CLK2 is generated by frequency-dividing clock CLK1 by half.

After the logic level of the reset signal RST is changed over, the frequency divider circuit 11 operates frequency division by half on the basis of the first rising of the clock CLK1. This establishes the phase of the clock CLK2, and consequently the phase of the output timing of the output data DO1 and DO2 synchronized with the clock CLK2 are established.

Next, the operation of the ADC 10 is explained by using the timing charts of data of each parts shown in FIGS. 2A to 2H. A comparator 2 (here, the part of the ADC for converting the analog signal into the digital signal referred to as a comparator) captures an analog input signal VIN at the rising of the clock CLK1, converts it into a digital data $D_A$, and then outputs at the trailing edge of the clock CLK1 (see FIGS. 2A to 2D) to a latch circuit 4.

A latch circuit 4 of a demultiplexer 3 (surrounded by a broken line latches the digital data $D_A$ (FIG. 2C) synchronously) with the trailing of the clock CLK1, and outputs it as the digital data $D_B$ at the next successive CLK1 trailing edge (FIG. 2D). Therefore, the phase of the digital data $D_B$ are time delayed by approximately one cycle of CLK1 compared to the digital data $D_A$.

When the reset signal RST (FIG. 2E) is changed over from the logic "H" to the logic "L" at the time $t_1$, the frequency divider circuit 11 starts frequency dividing operation. As shown in FIG. 2E, after the logic of the reset signal RST changes over at the time $t_1$, the frequency divider circuit 11 divides the clock CLK1 by half on the basis of the initial rising of the clock CLK1. As a result, as shown in FIG. 2F, the clock CLK2 is established as the signal which rises at the time $T_1, T_3, T_5 \ldots$.

A latch circuit 5 latches the digital data $D_B$ synchronously with the rising of the clock CLK2, and outputs it as the output data DO2 (FIG. 2G). Similarly, the latch circuit 6 latches the digital data $D_A$ synchronously with the rising of the clock CLK2, and outputs it as the output data DO1 (FIG. 2H). As a result, as shown in FIGS. 2G and 2H, the output data DO1 and DO2 become the data rows converted from the digital data $D_A$ in parallel with the data rate, and the data rate is the half of the digital data $D_A$. At this time, establishment of the timing of the rising of the clock CLK2 establishes the output timing of the output data DO1 and DO2.

Through the above structure, the ADC 10 arranges the digital data $D_A$ generated in order of time, and then outputs it in each specified block in parallel by means of the demultiplexer 3; the ADC converts the digital data to DO2 and DO1 and outputs them. At this time, the latch circuit 4 of the demultiplexer 3 functions pursuant to the clock CLK1, and the latch circuits 5 and 6 of the demultiplexer 3 function pursuant to the clock CLK2 generated by frequency-dividing the clock CLK1 by half.

In this case, after the logic level of the reset signal RST which is input from the external is changed over, the frequency divider circuit 11 divides the clock CLK1 by half on the basis of the initial rising of the clock CLK1. This establishes the phases of the clock CLK2, and the phases of the output data DO2 and DO1 are also established.

When the clock CLK2 is generated on the basis of only the rising of the clock CLK1, the phase of ADC according to the related art is not established, and two types of clock CLK2 are generated. However, as in the case of the present invention, when the clock CLK2 is generated on the basis of the initial rising of the clock CLK1 after the logic level of the reset signal RST is changed over, the phases are established and only one clock CLK2 is generated.

In this way, the frequency divider circuit 11 which can control the phase of the clock CLK2 is provided in the ADC 10, the phase of the clock CLK2 can be established and the output timing of the output data DO2 and DO1 can also be established.

Figure 3:
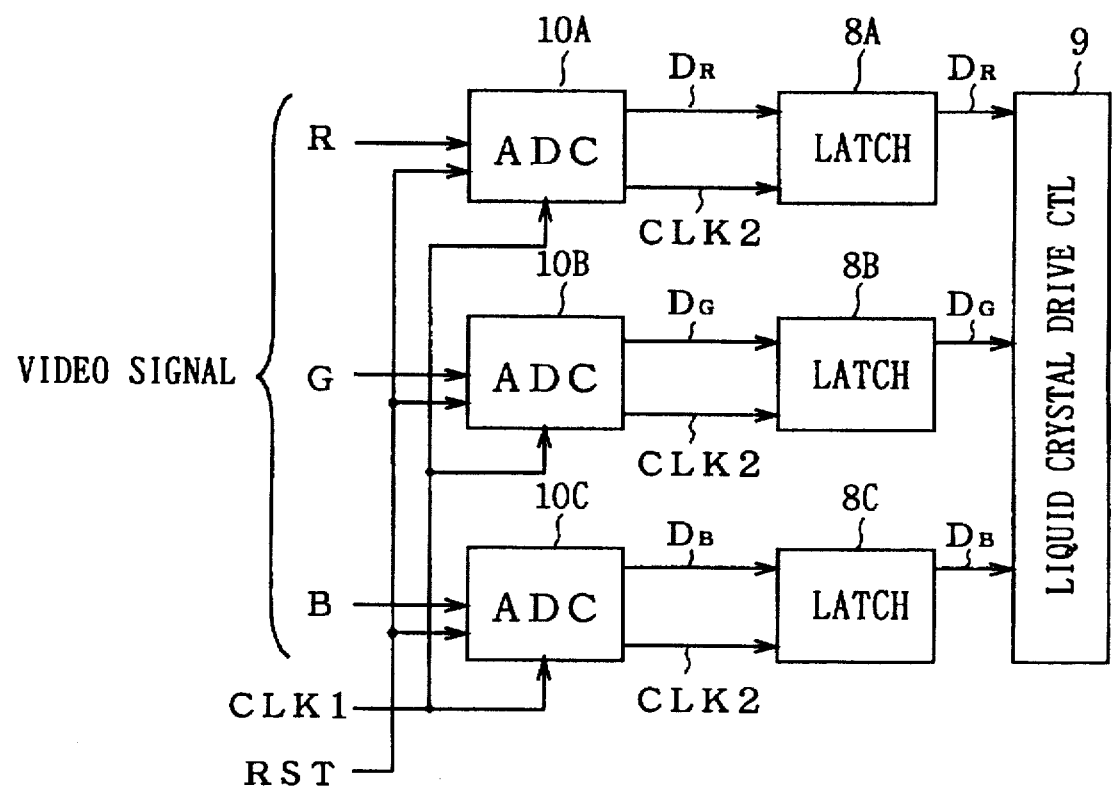
FIG. 3 is a block diagram showing a liquid crystal display device using the analog-to-digital converter according to the second embodiment of the present invention.

Next, the second embodiment according to the present invention is explained by using FIG. 3.

When the ADC 10 shown in FIG. 1 is used to digitize video signals R, G and B, the output timing can be synchronized among each ADC 10. This enables to design the clocks for the latch circuits provided in the following stage of each ADC 10.

For example, as shown in FIG. 3, it is used as ADCs for driving a liquid crystal display device. In this case, analog video signals R, G and B are input into respective 10A, 10B and 10C which are the ADCs of the present invention, and converted into digital signals (for example, six bits) by the ADCs 10A, 10B and 10C synchronously with the first clock signal CLK1 shown in FIG. 1. The converted digital signals are supplied to latch circuits 8A, 8B and 8C respectively connected in the next stage through the synchronization with the second clock CLK2 which is generated by frequency-dividing the first clock CLK1 by half in the frequency divider circuit with the reset signals.

Three color signals DR, DG and DB transmitted from each latch circuit 8A, 8B and 8C consisting of CMOS are supplied to the drive circuit 9 for the liquid crystal display device.

According to the above structure, the frequency divider circuit 11 which can control the phase of the clock CLK2 by the reset signal RST is provided inside the ADC 10, so that the phases of the clock CLK2 can be established. Thus, it is possible to establish the output timing of the output data DO2 and DO1.

According to the embodiment described above, the frequency divider circuit 11 functions when the logic level of the reset signal RST is changed over from the logic "H" to the logic "L". However, the present invention is not only limited to this, but also the frequency divider circuit 11 can function when the logic level of the reset signal RST is changed over from the logic "L" to the logic "H". The point is that when the reset signal RST is frequency divided as the trigger, the same effect as above can be obtained.

Furthermore, in the embodiment described above, the demultiplexer 3 separates the digital data $D_A$ into two output data DO2 and DO1. However, the present invention is not only limited to this, but the number of the digital data separated by the demultiplexer can be three or more.

Furthermore, in the embodiment described above, the ADC 10 with six-bit construction is used. However, the present invention is not only limited to this, but the other value can be assigned as the number of bits.

Furthermore, in the embodiment described above, the present invention is applied to the ADC 10 with the built-in demultiplexer 3. However, the present invention is not only limited to this, but can widely applied to a single demultiplexer and other circuits with built-in demultiplexers.

Furthermore, in the embodiment described above, the number of the comparator 2 and the demultiplexer 3 is one each. However, the present invention is not only limited to this, but a plurality of comparators 2 and demultiplexers 3 can be used.

As described above, according to the present invention, since the reset means for controlling the phases of the second clock output from the frequency divider circuit is provided, it is possible to establish the phase of the second clock and establish the output timing of the demultiplex circuit. Therefore, when using a plurality of demultiplex circuits, it is possible to synchronize the output timing of a plurality of demultiplex circuits.

Further, since the reset means for controlling the phase of the second clock output from the frequency divider circuit, it is possible to establish the phase of the second clock to establish the output timing of ADC. Therefore, when using a plurality of ADCs, it is possible to synchronize the output timing of a plurality of ADCs.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An analog-to-digital converter, comprising:

a frequency divider circuit for frequency-dividing a first clock to generate a second clock;

reset means for controlling the phase of said second clock output from said frequency divider circuit;

analog-to-digital conversion means for converting an analog input signal into successive digital data on the basis of said first clock; and a demultiplexer accepting the successive digital data of said analog-to-digital conversion means and for outputting alternate ones of the digital data to a first digital output and for outputting intermediate ones of the digital data to a second digital output, the demultiplexer responsive to both first and second clocks.

2. An analog to digital converter comprising:

a frequency divider circuit for frequency-dividing a first clock to generate a second clock;

reset means for controlling the phase of said second clock output from said frequency divider circuit;

a plurality of analog-to-digital conversion means for converting respective analog input signals into successive respective digital data on the basis of said first clock, respectively; and a plurality of demultiplexers, each connected to a respective one of said plural analog-to-digital conversion means and each accepting the successive digital data of its respective analog-to-digital conversion means, each demultiplexer outputting alternate ones of its respective digital data to a first digital output and outputting intermediate ones of its respective digital data to a second digital output, the demultiplexer responsive to both first and second clocks.

3. An analog to digital converter comprising:

comparator means for outputting successive digital values representative of an analog input signal in response to successive first clock cycles;

a selectively operable frequency divider for dividing the successive first clock cycles into a sub-multiple thereof to provide successive second clock cycles, said frequency divider operable in response to a command to initiate frequency division;

a first digital path having a first latch therein responsive to said second clock cycles to latch alternate ones of the successive digital values outputted by said comparator to provide a first digital output; and a second digital path having a first and second connected latch therein, the first latch of said second digital path responsive to said first clock cycles and latching each successive digital values outputted by said comparator, the second latch of said second digital path responsive to said second clock cycles and latching digital values from said first latch of said second digital path intermediate said alternate ones of the successive digital values to provide a second digital output.

* * * * *